US012090907B2

(12) United States Patent
Rakow

(10) Patent No.: US 12,090,907 B2
(45) Date of Patent: Sep. 17, 2024

(54) METHOD FOR OPERATING A STORAGE SYSTEM OF A MOTOR VEHICLE FOR A PRODUCT AND STORAGE SYSTEM

(71) Applicant: Daimler AG, Stuttgart (DE)

(72) Inventor: Momme Rakow, Neu-Ulm (DE)

(73) Assignee: Daimler AG, Stuttgart (DE)

( * ) Notice: Subject to any disclaimer, the term of this patent is extended or adjusted under 35 U.S.C. 154(b) by 432 days.

(21) Appl. No.: 17/603,871

(22) PCT Filed: Feb. 28, 2020

(86) PCT No.: PCT/EP2020/055259
§ 371 (c)(1),
(2) Date: Oct. 14, 2021

(87) PCT Pub. No.: WO2020/212004
PCT Pub. Date: Oct. 22, 2020

(65) Prior Publication Data
US 2022/0194286 A1 Jun. 23, 2022

(30) Foreign Application Priority Data
Apr. 17, 2019 (DE) ..................... 10 2019 002 862.7

(51) Int. Cl.
B60R 7/04 (2006.01)
B60N 3/10 (2006.01)
G06Q 30/0601 (2023.01)

(52) U.S. Cl.
CPC ......... B60N 3/105 (2013.01); G06Q 30/0621 (2013.01); B60R 7/04 (2013.01)

(58) Field of Classification Search
CPC ....... B60N 3/105; G06Q 30/0621; B60R 7/04
See application file for complete search history.

(56) References Cited

U.S. PATENT DOCUMENTS 4,485,919 A * 12/1984 Sandel ...................... A61L 2/26
428/167
6,843,458 B1 * 1/2005 Robinson ........... A47G 23/0216
248/314
(Continued)

FOREIGN PATENT DOCUMENTS

CN 1990307 A 7/2007
DE 102009030350 A1 * 12/2010 ............. B60N 3/105
(Continued)

OTHER PUBLICATIONS

DE 102009030350 A1 (Rampf), with machine translation. (Year: 2009).*
(Continued)

Primary Examiner — Dino Kujundzic
(74) Attorney, Agent, or Firm — Crowell & Moring LLP

(57) ABSTRACT

A method for operating a storage system of a motor vehicle for a product includes outputting a piece of product information for the product from a service provider external to the motor vehicle on an output device of the storage system. The method further includes transferring a selection of the product by a user of the storage system to the service provider by a transmission device of the storage system and adjusting a shape of a storage device of the storage system for the product by a shifting actuating mechanism of the storage device depending on the product.

10 Claims, 2 Drawing Sheets

(56) References Cited

U.S. PATENT DOCUMENTS

| | | | |
|---|---|---|---|
| 9,358,930 B1* | 6/2016 | Sic | B60R 7/06 |
| 9,834,148 B2* | 12/2017 | Gaudig | B60N 3/103 |
| 10,213,913 B2* | 2/2019 | Pang | B65D 25/106 |
| 11,623,576 B2* | 4/2023 | Hurd | G06F 17/00 |
| | | | 701/49 |
| 2004/0039525 A1 | 2/2004 | Draeger et al. | |
| 2014/0379507 A1 | 12/2014 | Pitt | |
| 2017/0213464 A1 | 7/2017 | Emadi et al. | |
| 2020/0062160 A1* | 2/2020 | Stock | B60N 3/107 |
| 2020/0180490 A1* | 6/2020 | Benliyan | B60N 3/105 |

FOREIGN PATENT DOCUMENTS

| | | |
|---|---|---|
| DE | 10 2015 013 074 A1 | 4/2017 |
| DE | 10 2016 225 747 A1 | 6/2018 |
| DE | 10 2017 210 640 A1 | 12/2018 |
| JP | 2003-90730 A | 3/2003 |
| JP | 2013-50784 A | 3/2013 |
| WO | WO 2018/114216 A1 | 6/2018 |

OTHER PUBLICATIONS

PCT/EP2020/055259, International Search Report (PCT/ISA/220 and PCT/ISA/210) dated May 27, 2020, with partial English translation, enclosing Written Opinion of the International Searching Authority (PCT/ISA/237) (Thirteen (13) pages).

Chinese Office Action issued in Chinese application No. 202080029404.7 dated Jan. 19, 2023, with partial English translation (Twelve (12) pages).

Chinese Office Action issued in Chinese application No. 202080029404.7 dated Apr. 12, 2023, with partial English translation (Eleven (11) pages).

\* cited by examiner

METHOD FOR OPERATING A STORAGE SYSTEM OF A MOTOR VEHICLE FOR A PRODUCT AND STORAGE SYSTEM

BACKGROUND AND SUMMARY OF THE INVENTION

The invention relates to a method for operating a storage system of a motor vehicle for a product. A piece of product information for the product of a service provider external to the motor vehicle is output on an output device of the storage system depending on a decision criterion. A product selected by a user of the storage system is transmitted to the service provider by means of a transmitting device of the storage system. Furthermore, the invention relates to a storage system.

DE 10 2016 225 747 A1 relates to a method for operating a motor vehicle, having the following steps carried out by a communication device of the motor vehicle: establishing a current position of the motor vehicle and setting a perimeter around the motor vehicle; identifying a service provider in the set perimeter; providing a data communication connection to a server device, external to the motor vehicle, of the identified service provider; and, by means of the data communication connection provided, providing an operating menu for selecting a service. Depending on a user input, an order signal is generated which describes the selected service, and a payment signal is generated, which describes an authorization of the service provider to collect a monetary value from a user account of the user of the motor vehicle. Both signals are transmitted to the server device.

The object of the present invention is to create a method and a storage system by means of which an improved storage of a selected product can be carried out.

This object is solved by a method and by a storage system according to the independent claims. Advantageous embodiments are specified in the dependent claims.

An aspect of the invention relates to a method for operating a storage system of a motor vehicle for a product. A piece of product information for the product of a service provider external to the motor vehicle is output on an output device of the storage system depending on a decision criterion. A product selected by a user of the storage system is transmitted to the service provider by means of a transmitting device of the storage system.

It is provided that an adjustment of a shape of a storage device of the storage system is carried out for the selected product by means of a shifting actuation mechanism of the storage device depending on the selected product.

In doing so, it is made possible that the storage device, in particular a surface of the storage device, is adjusted to the selected product. In particular, it can be provided that a surface of the storage device or the storage device is adjusted to the shape of the product. Furthermore, the storage device, for example, can also be adjusted to the type of product. For example, for a drink can, a kind of cupholder can be formed by means of the storage device, such that the drink can can be reliably held in the motor vehicle. Furthermore, the surface can also be adjusted to the type of product, such that the product can be prevented from slipping out of place by means of the storage device thanks to the deformation of the storage device.

In particular, the storage system can have an electronic computing device, by means of which different steps of the method, for example controlling the storage device, can be carried out. Furthermore, it can be provided, for example, that an output signal is generated by means of the electronic computing device, such that the product information of the product can be correspondingly displayed on the output device. Furthermore, a transmitting signal can be generated by means of the electronic computing device, such that the information about the selected product can be transmitted to the service provider. Furthermore, the adjustment signal for the storage device can also be generated by the electronic computing device.

In other words, it can be provided that the storage device, which can be provided, for example, as an interior or as an exterior, is adjusted to the customer's requirements, in particular to the selected product. The storage device can be, for example, a central console of the motor vehicle, or general shelving, which is adjusted to the respective size and number of products or to the product. Thus, a cupholder can be provided, for example, or a fitting shelf for a mobile telephone.

In particular, it is also possible as a result of the storage system according to the invention that display systems in drive-through sales outlets, so-called drive-in sales outlets, can be omitted, since the corresponding product information can be output on the output device of the storage system. In particular, the drive-in displays are often difficult to read and often can often only be updated with considerable effort. This display system can be replaced by the output device of the storage system.

In particular, the storage device can have a plurality of different surfaces which can be adjusted separately to a product. In other words, it can be provided that a plurality of different products can be stored by means of the storage device, wherein, depending on these different products, the surface of the storage device can then be correspondingly adjusted to this plurality. For example, it can be provided that a drink can and a mobile telephone are to be placed or stored on the storage device. Then, it can be provided that the storage device can be adjusted by means of the shifting actuation mechanism in such a way that a storage location for the drink can and the mobile telephone can be provided.

According to an advantageous embodiment, a payment process for paying for the selected product is carried out by means of the storage system, in particular by means of the transmitting system. In other words, a digital payment possibility can be created, such that, after selecting the product, the user can correspondingly pay for the product directly with the service provider, for example by means of online payment systems, such that the user only has to collect the product at a delivery counter, for example. Thus, an increase in comfort for the user can be achieved. Thus, a time-consuming action at the collection location can be implemented as a result of the payment transaction already having been carried out. In other words, it can be provided that a payment signal is additionally generated by means of the electronic computing device, the signal being transmitted to the service provider or to a payment device of the service provider by means of the transmission device, such that the payment process has already been completed. In particular, the transmission device can, for this purpose, have a secured transmission channel, such that the payment process can be carried out reliably. For example, the payment signal can then be correspondingly encrypted by means of the electronic computing device.

It has furthermore proved to be advantageous when the product is displayed as a decision criterion depending on a position of the motor vehicle and/or a planned driving route of the motor vehicle is displayed as a decision criterion and/or a preferred product input by the user as a decision criterion. For example, as the decision criterion, a geofencing event can be regarded as the position. In other words, it can be provided that, should the motor vehicle be driven beyond a predetermined position, the geo-fence, the product information is correspondingly output on the output device. The geo-fence can be generated depending on a periphery around the service provider. For example, a periphery of 50 kilometers can be generated around a restaurant as the service provider, and as soon as the motor vehicle is in this geo-fence, the product information is output on the output device. Furthermore, it can be provided, for example, that corresponding service providers are proposed depending on the planned driving route, which the motor vehicle is able to approach and the products thereof being able to be displayed as product information on the output device. Furthermore, it can be provided that, for example, the user makes a product input in advance, in other words, the user can, for example, input that they would like to eat during the journey with the motor vehicle, such that then, depending on this preferred product input by the user, the corresponding product information of the service provider can be output on the output device.

In a further advantageous embodiment, the output device is provided as an optical output device and/or as an acoustic output device. For example, as the optical output device, a screen, in particular a display, can be provided, on which the product information can then be displayed. For example, the screen can also be formed as a touch-sensitive screen, such that the selection of the product, for example, can be carried out by touching the screen, in particular the product information. Furthermore, alternatively or additionally, the output device can be provided as an acoustic output device, such that the product information, for example, can be acoustically provided to the user and/or the user can order and pay, for example, by means of a speech input. Thus, it is possible for the user to easily and comfortably order the product and, in particular depending on this input, the storage device is already adjusted depending on this input.

Furthermore, it has proved to be advantageous when, depending on a position of the motor vehicle and/or a journey time to a collection location of the product, the shape of the storage device is adjusted to the product. For example, it can be provided that only upon driving over a geo-fence as the position of the motor vehicle, the storage device is correspondingly adjusted. Furthermore, it can be provided that only upon exceeding a predetermined journey time to the collection location of the product, the storage device is adjusted. In particular, for example only 10 seconds, in particular 30 seconds, in particular one minute, in particular two minutes, in particular five minutes, before reaching the collection location, the storage device is adjusted to the product. Thus, it can be prevented, for example, that further products, which are on the storage device, can slip out of place.

In an advantageous embodiment, the shifting actuating mechanism as a matrix shifting mechanism is provided with adjusted end geometries for generating the adjusted shape of the storage device. As a result of the matrix arrangement of the controllable shifting actuating mechanism with adjusted end geometries, the storage device can follow the actuating mechanism, such that a closed surface is generated, which can assume different geometries. Thus, the storage device can be adjusted to the different geometric shapes of the product. Furthermore, a plurality of products can be held or stored by means of the storage device. Thus, a surface that can be adapted to the user's requirements for the motor vehicle can be provided and as both an interior and an exterior. Thus, the user can adjust the interior or exterior to their personal requirements. For example, a central console can be provided as a storage device for the respective size and number of drinking vessels, and thus as a cup holder, or a fitting shelf for the personal mobile telephone can be provided. Further possible fields of application can be, for example, further shelving, adaptive nozzle geometries for controlling the airflow in the interior or in the exterior for influencing the aerodynamics or the cd value.

Furthermore, it is advantageous when a flexible membrane of the storage device is adjusted by means of the shifting mechanism for generating the adjusted shape of the storage device. Thus, it is made possible that a closed surface is provided by means of the storage device. The flexible membrane can particularly advantageously be adjusted with the shifting mechanism to the product in such a way that this can be stored reliably and precisely. As a result of the flexible membrane, a highly flexible storage device can thus be implemented to store the product inside the motor vehicle or on the motor vehicle. Furthermore, as a result of the closed surface, a penetration of foreign bodies into the storage system can be prevented.

According to a further advantageous embodiment, the adjusted shape of the storage device can additionally be generated by means of a vacuum device of the storage device. In other words, along with the shifting actuating mechanism, a vacuum device is additionally provided, by means of which the storage device, in particular the flexible membrane of the storage device, can be adjusted to the shape of the product. Thus, the storage device can be adjusted in a highly precise manner to the shape of the product or to the type of product.

Furthermore, it is advantageous when the shape of the storage device is adjusted depending on an outer shape of the product and/or a type of product of the product. By adjusting to the outer shape of the product, the product can be reliably held on the storage device. By adjusting to the type of product, for example with liquids, a type of funnel, for example, can be created, such that, in the event of a possible leak of the liquid out of the vessel, the liquid can nevertheless be held by the storage device. Furthermore, corresponding surfaces can be created, for example, in order to be able to hold the product. For example, should it be established that it is a mobile telephone as the type of product, a rough surface can be created by means of the storage device, such that the mobile telephone can be prevented from slipping out of place.

A further aspect of the invention relates to a storage system of a motor vehicle for a product having at least one output device, a transmission device and a storage device. The storage system is formed to carry out the method and an advantageous embodiment thereof. In particular, the method is carried out using the storage system.

Another further aspect of the invention relates to a motor vehicle having a storage system. The motor vehicle is formed, in particular, as a passenger vehicle.

Advantageous embodiments of the method are to be regarded as advantageous embodiments of the storage system and of the motor vehicle. The storage system and the motor vehicle have concrete features for this, which enable the method or an advantageous embodiment thereof to be carried out.

A method described herein can also be present in the form of a computer program (product), which implements the method on a control unit, for example the electronic computing device, when it is performed on the control unit. Similarly, an electronically readable medium having electronically readable control information saved thereon can be present, which comprises at least one described computer program product and is formed in such a way that it carries out a described method when using the data medium in a control unit of an MR system.

In this exemplary embodiment, the electronic computing device comprises an interface, a processor and a storage unit. The interface can be a hardware or software interface (for example PCI bus, USB or Firewire). A computing unit can have hardware elements or software elements, for example a microprocessor or a so-called FPGA (acronym for "Field Programmable Gate Array"). A storage unit can be implemented as an impermanent internal memory (Random Access Memory, short RAM) or as a permanent bulk memory (hard drive, USB stick, SD card, Solid State Disk).

Further advantages, features and details of the invention emerge from the below description of preferred exemplary embodiments and by means of the drawings. The features and feature combinations mentioned above in the description and the features and feature combinations mentioned below in the description of the figures and/or shown in the figures alone can be used not only in the respectively specified combination, but also in other combinations or on their own, without leaving the scope of the invention.

DETAILED DESCRIPTION OF THE DRAWINGS

In the Figures identical or functionally identical elements are provided with the same reference numbers.

Figure 1:
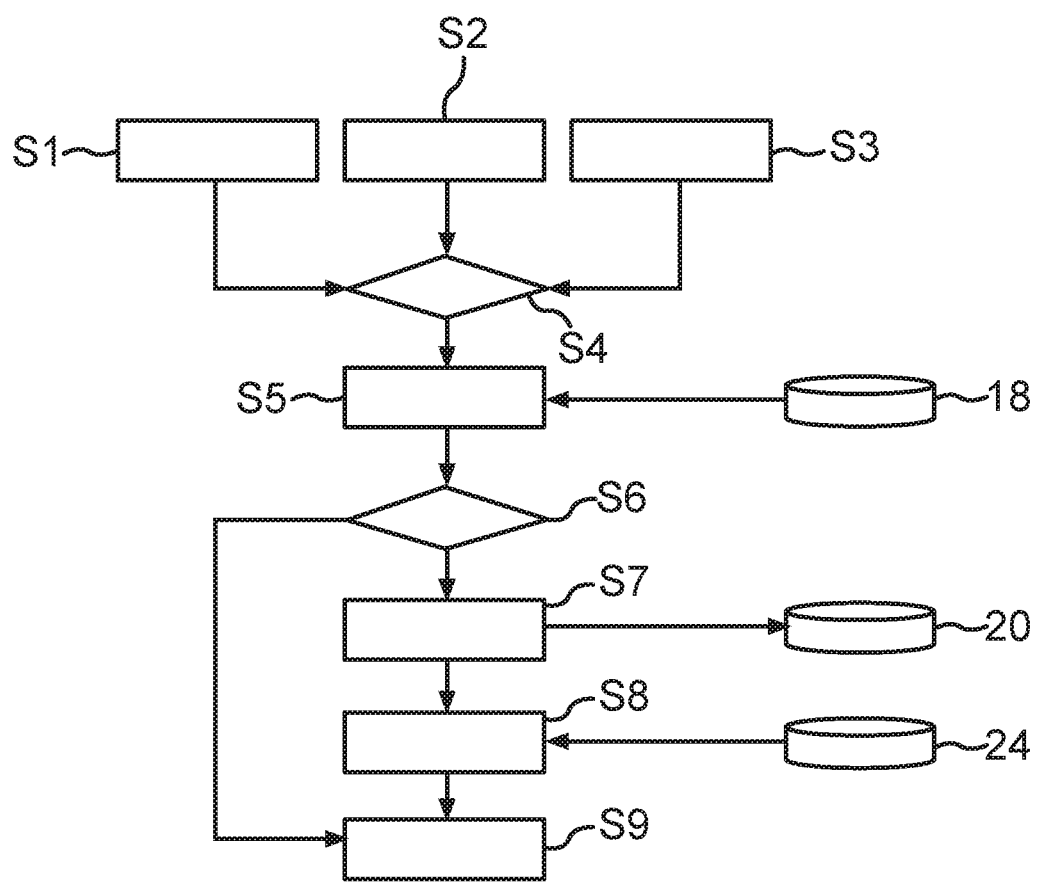
FIG. 1 is a schematic flowchart of an embodiment of the method.
Figure 2:
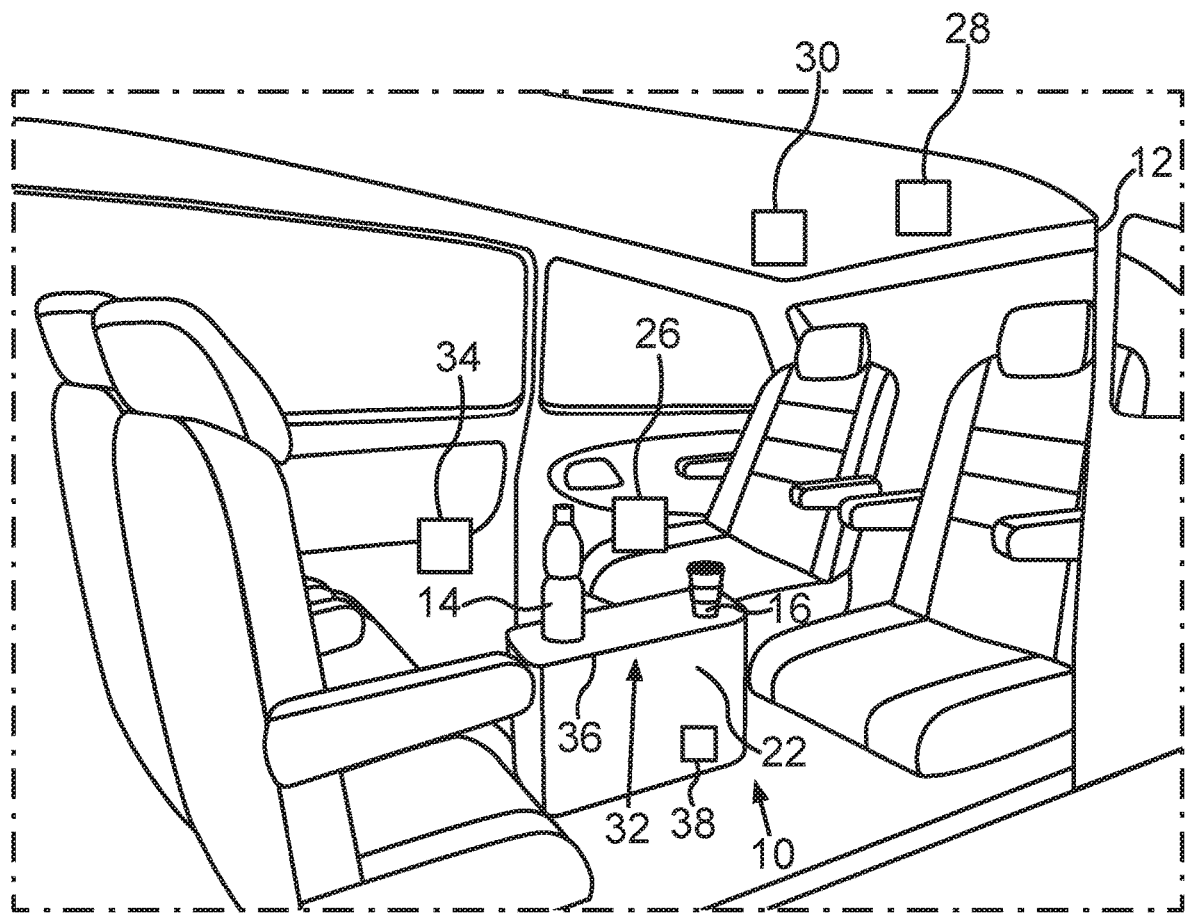
FIG. 2 is a schematic perspective view of an embodiment of the storage system.

In a schematic view, FIG. 1 shows a flowchart of an embodiment of the method for operating a storage system 10 (FIG. 2) of a motor vehicle 12 (FIG. 2). The storage system 10 is formed for storing a product 14, 16 (FIG. 2).

It can be provided in a first step S1 that the choice of a shop is carried out via a navigation system of the motor vehicle 12. In a second step S2, reaching a position of the motor vehicle 12 can be provided. Furthermore, in a third step S3, further decision criteria can lead to the fourth step S4, which describes the start of the method. In a fifth step S5, it can be checked as to whether the product 14, 16 is available from a service provider. To do so, a corresponding calibration can be carried out, for example via a database 18, which can be provided externally to the motor vehicle, for example. In a sixth step S6, a decision then takes place as to whether or not the service or provision can be provided. Should the service not be provided, then it is transferred from the sixth step S6 to the ninth step S9, in which the method is ended. Should the service be available, then a payment of the service or the product 14, 16 can be carried out in a seventh step S7. To do so, it can be provided that a corresponding payment process can be carried out by means of a billing system 20. In the eighth step S8, the output of the product information and/or the adjustment of a storage device 22 (FIG. 2) of the storage system 10, in particular, is then carried out. The service or the product 14, 16 can be provided, for example, via a server 24 external to the motor vehicle or via a website or an application. After the eighth step S8, the end of the method is then carried out in the ninth step S9.

According to the invention, it is provided that, in the method for operating the storage system 10 of the motor vehicle 12 for the product 14, 16, an output of a piece of product information of a service provider external to the motor vehicle is carried out depending on a decision criterion on an output device 26, 28 (FIG. 2) of the storage system 10. A transmission of a product 14, 16 selected by a user of the storage system 10 to the service provider is carried out by means of a transmission device 30 (FIG. 2) of the storage system 10. It is provided that, in the eighth step S8, a shape of the storage device 22 of the storage system 10 for the selected product 14, 16 is adjusted by means of a shifting actuating mechanism 32 (FIG. 2) of the storage device 22 depending on the selected product 14, 16.

In particular, for carrying out the method, the storage system 10 can further have an electronic computing device 34, by means of which method steps can be carried out.

Thus, it is made possible that the storage device 22, in particular a surface of the storage device 22, is adjusted to the selected product 14, 16. In particular, it can be provided that a surface of the storage device 22 or the storage device 22 is adjusted to the shape of the product 14, 16. Furthermore, the storage device 22, for example, can also be adjusted to the type of product. For example, for a drink can, a kind of cup holder can be formed by means of the storage device 22, such that the drink can can be reliably held in the motor vehicle 12. Furthermore, the surface can also be adjusted to the type of product, such that the product 14, 16 can be prevented from slipping out of position by means of the storage device 22 due to the deformation of the storage device 22.

Furthermore, it can be provided, in particular, that the payment process for paying for the selected product 14, 16 is carried out in the seventh step S7 by means of the storage system 10, in particular by means of the transmission device 30. Furthermore, it can be provided that the product 14, 16 is displayed depending on the position, as specified in the second step S2, of the motor vehicle 12, as a decision criterion and/or a planned driving route, as specified in the first step S1, of the motor vehicle 12 as a decision criterion and/or a preferred product input by the user as a decision criterion.

Furthermore, it can be provided that, depending on a position of the motor vehicle 12 and/or a driving time to a collection location of the product 14, 16, the shape of the storage device 22 is adjusted to the product 14, 16.

In a schematic perspective view, FIG. 2 shows an embodiment of the storage system 10. In the present exemplary embodiment, the storage system 10 has an output device 26, 28, presently two output devices 26, 28, wherein the output device 26, 28 is provided as an optical output device 26 and/or as an acoustic output device 28.

Furthermore, it can be provided that the shifting actuating mechanism 32 is provided as a matrix shifting actuating mechanism 32 with adapted end geometries for generating the adjusted shape of the storage device 22. Furthermore, a flexible membrane 36 of the storage device 22 can be adjusted by means of the shifting actuating mechanism 32 to generate the adjusted shape of the storage device 22.

Furthermore, it can be provided that the adjusted shape of the storage device 32 is additionally generated by means of a vacuum device 38 of the storage device 22.

The shape of the storage device 22 can be adjusted in particular depending on an outer shape of the product 14, 16 and/or a type of product 14, 15. By adjusting to the outer shape of the product 14, 16, the product 14, 16 can be reliably held on the storage device 22. By adjusting to the type of product, for example with liquids, a kind of funnel, for example, can be created, such that, in the event of possible leaking of the liquid from the vessel, the liquid can nevertheless be held by the storage device 22. Furthermore, corresponding surfaces, for example, can be created, in order to be able to hold the product 14, 16. For example, should it be established that it is a mobile telephone, as the type of product, a rough surface can be created by means of the storage device 22, such that the mobile telephone can be prevented from slipping out of position.

In particular in the present exemplary embodiment, the product 14 can be formed as a bottle and the product 16 as a drink cup. In other words, in the present exemplary embodiment, a cup holder is formed by means of the storage device 22. It is possible that further shapes, for example for shelving a mobile telephone, can be formed.

The invention claimed is:

1. A method for operating a storage system of a motor vehicle for a product from a service provider external to the motor vehicle, wherein the storage system comprises: an output device, a transmission device, and a shifting actuating mechanism that adjusts the shape of a storage device each controlled by a computing unit so as to execute the method. the method comprising the steps of:
    outputting a piece of product information for the product on the output device;
    transferring a selection of the product by a user to the service provider; and
    adjusting the shape of the storage device by the shifting actuating mechanism in response to the product selection.

2. The method according to claim 1, further comprising the step of paying for the product via the storage system.

3. The method according to claim 1, further comprising the step of displaying the product depending on a position of the motor vehicle or on a planned driving route of the motor vehicle or on an input by the user.

4. The method according to claim 1, wherein the output device is an optical output device or an acoustic output device.

5. The method according to claim 1, wherein the adjusting depends on a position of the motor vehicle or on a journey time to a collection location of the product.

6. The method according to claim 1, wherein the shifting actuating mechanism is a matrix shifting actuating mechanism with adjustable end geometries for adjusting the shape of the storage device.

7. The method according to claim 1, wherein a flexible membrane of the storage device is adjusted by the shifting actuating mechanism for adjusting the shape of the storage device.

8. The method according to claim 1, wherein the adjusting of the shape of the storage device of the storage system is additionally performed by a vacuum device of the storage device.

9. The method according to claim 1, wherein the adjusting of the shape of the storage device depends on an outer shape of the product or on a type of the product.

10. A storage system of a motor vehicle for a product, comprising:
    an output device;
    a transmission device; and
    a storage device;
    wherein the storage system is configured to perform the method according to claim 1.

* * * * *